P. D. THROPP.
TIRE MOLD.
APPLICATION FILED MAR. 30, 1908.

911,182.

Patented Feb. 2, 1909.
2 SHEETS—SHEET 1.

Witnesses:
F. George Barry
Henry Thieme.

Inventor:
Peter D. Thropp
By Brown & Seward
his Attorneys

P. D. THROPP.
TIRE MOLD.
APPLICATION FILED MAR. 30, 1908.
911,182.
Patented Feb. 2, 1909.
2 SHEETS—SHEET 2.
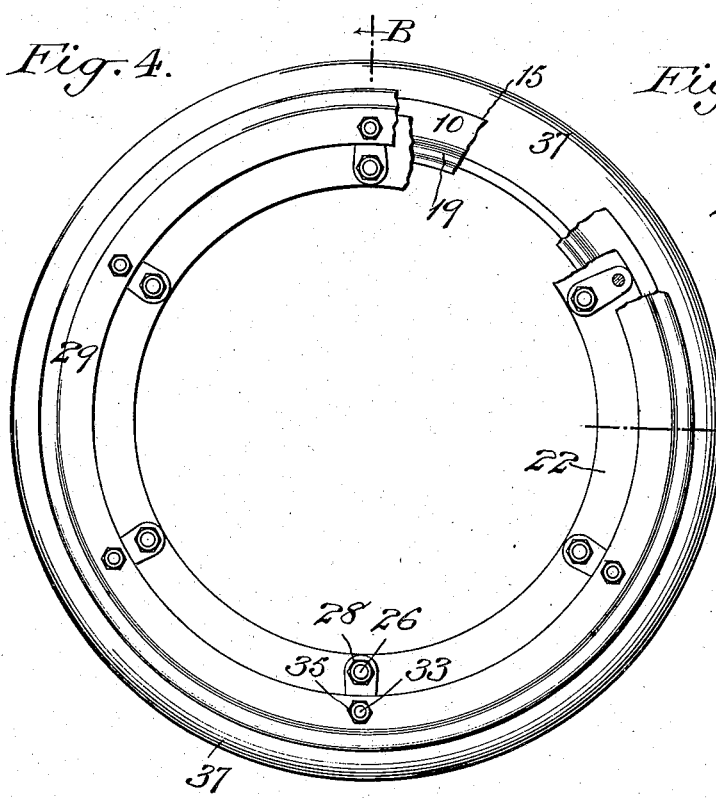
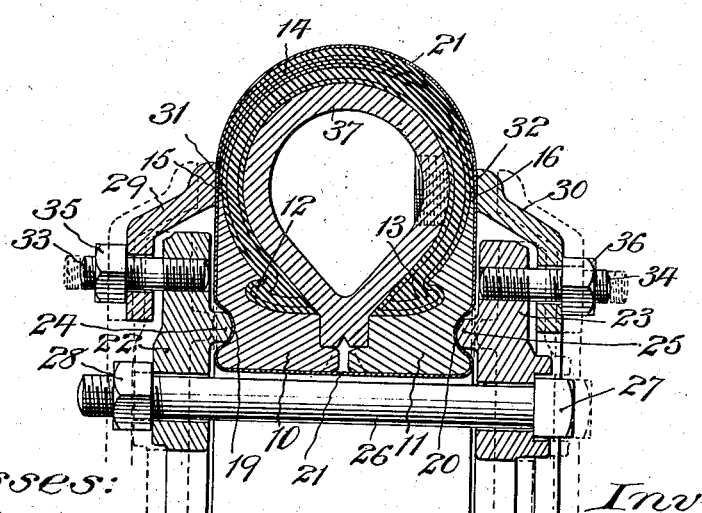
Witnesses:
J. George Barry.
Henry Thieme.
Inventor:
Peter D. Thropp
by Brown & Ward
his Attorneys

UNITED STATES PATENT OFFICE.

PETER D. THROPP, OF TRENTON, NEW JERSEY.

TIRE-MOLD.

No. 911,182.  Specification of Letters Patent.  Patented Feb. 2, 1909.

Application filed March 30, 1908. Serial No. 424,088.

*To all whom it may concern:*

Be it known that I, PETER D. THROPP, a citizen of the United States, and resident of Trenton, in the county of Mercer and State of New Jersey, have invented a new and useful Tire-Mold, of which the following is a specification.

This invention relates to tire molds and more particularly to molds for curing tires for the shoes or casings of tires by what is commonly known as the "open cure" process.

The object is to provide means for curing the tire at a single step without any liability of the tire becoming distorted during the curing process and further to provide means for exerting the desired amount of pressure on the exposed portion of the tire during the curing process.

Figure 1:
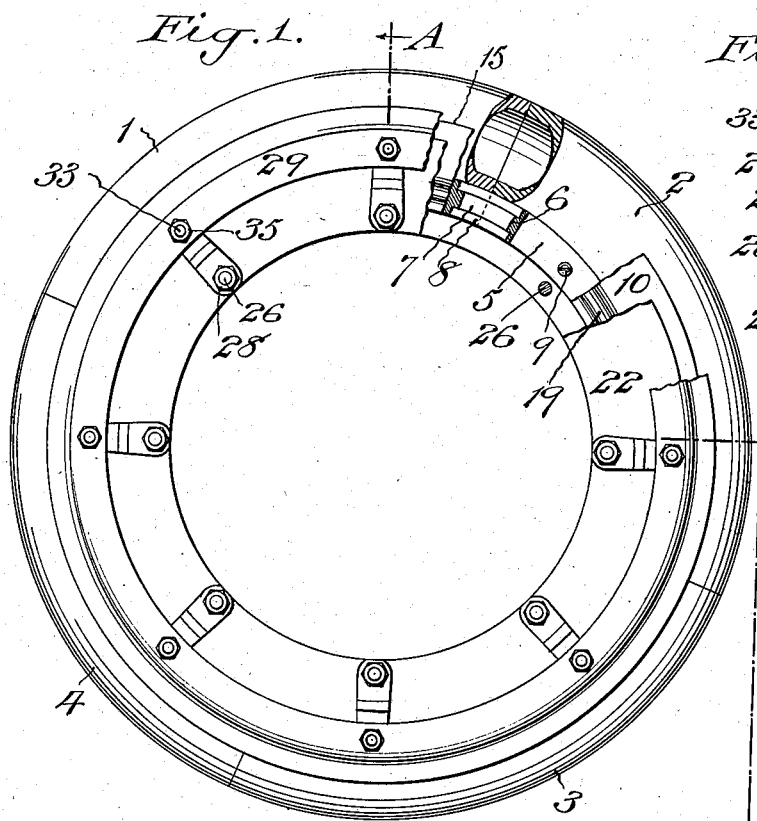
Figure 2:
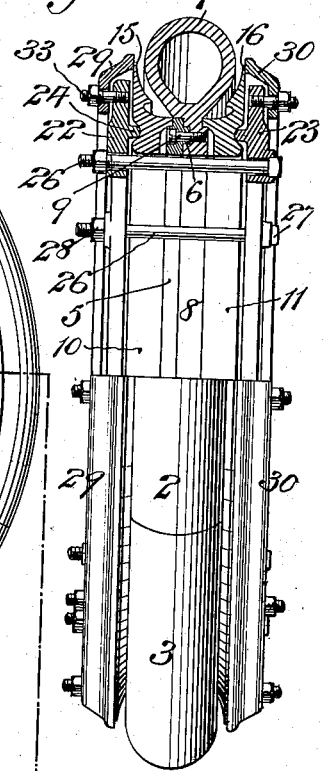
Figure 3:
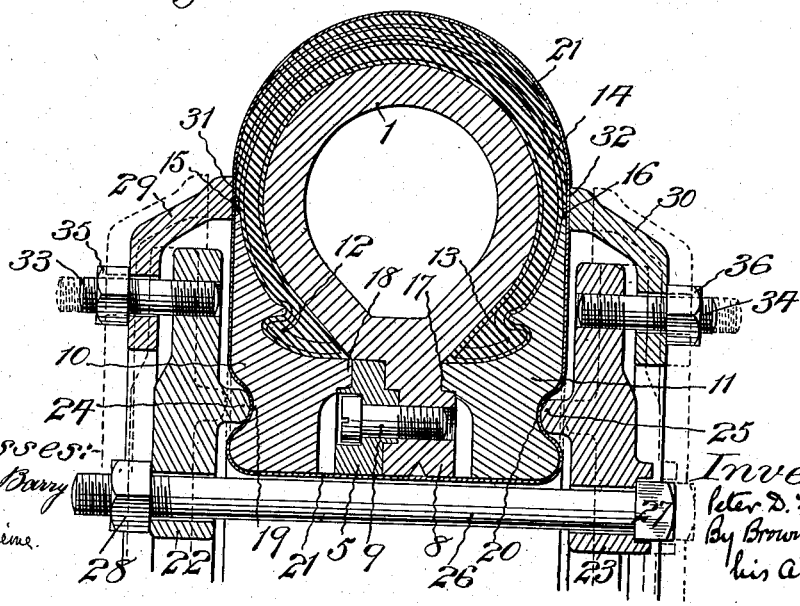

In the accompanying drawings, Figure 1 is a view of the mold in side elevation, partly broken away, Fig. 2 is a section in the plane of the line A—A of Fig. 1, Fig. 3 is an enlarged transverse section showing the tire and wrapping tape in position on the mold and showing in dotted lines the position which the pressure rings and wrapping tape or band assume before the pressure rings are forced together to press and tighten the tape or band and hold the mold sections in position, Fig. 4 is a view similar to Fig. 1, showing a modified form, Fig. 5 is a section in the plane of the line B—B of Fig. 4, and Fig. 6 is a transverse section of the same, showing in full lines the position of the parts when the pressure rings are closed into operative position and in dotted lines the position which they assume before they are so forced together.

Referring to Figs. 1, 2 and 3, the core of the mold is composed of several hollow sections arranged end to end completing a ring. In the present instance there are four of these sections, each a quadrant's distance in length and denoted by 1, 2, 3 and 4. These several sections, 1, 2, 3 and 4, are held in assembled adjustment in the form of a ring by means of a continuous annular ring 5 having a rib 6 projecting laterally from its inner face which engages a groove 7 formed in the side of the fins 8 which project inwardly from the several core sections 1, 2, 3 and 4.

The ring 5 is conveniently made fast to the fins 8 by means of screws 9.

The mold consists of two half sections 10 and 11 having their inner faces shaped to form the clencher rings 12 and 13 on the tire 14 and extending upwardly along the sides of the tire adjacent to the clencher rings to a distance half the diameter of the tire more or less and terminating in thin edges 15, 16.

It is intended that the mold sections 10 and 11 when they are forced together to form the tire shall have their outer faces separated from each other about the diameter of the tire and the movement of these core sections toward each other is limited by the engagement of projections 17, 18, thereon, with the fins 8 and ring 5, respectively.

The outer faces of the mold sections 10 and 11, preferably near their inner edges, are provided with annular depressions 19, 20, for the purpose of tightening the wrapping tape or band 21, as will hereinafter appear.

Pressure rings 22, 23, occupy positions exterior to the mold sections 10 and 11 and are provided on their adjacent faces with rounded faced projections 24, 25, in position to enter the depressions 19, 20, on the mold sections when the pressure rings are forced toward each other. The pressure rings 22, 23, are forced toward each other by means of draw bolts 26 passing through the pressure rings at suitable intervals and provided at one end with heads 27 and at the opposite end with nuts 28.

The pressure rings 22, 23, carry auxiliary pressure rings 29, 30, the operating faces 31, 32, of which are arranged to press against the wrapping tap or band in proximity to the thin edges 15, 16, of the mold sections 10, 11.

The auxiliary pressure rings 29, 30, are made fast to the pressure rings 22, 23, by means of screws 33, 34, which pass through the auxiliary rings and screw into the pressure rings 22, 23, and which are further provided with nuts 35, 36, for adjusting the auxiliary pressure rings relative to the pressure rings.

In operation, the tire having been formed on the core, the mold sections 10 and 11 are placed in position and by means of hydraulic or other suitable pressure are forced toward one another into the position shown in full lines, Fig. 3, to form the clencher rings on the tire. The mold is then removed from the press and the tire and mold sections are wrapped by means of the tape or band 21, the latter passing around the tire and mold sections as clearly shown in Fig.

3. The pressure rings 22, 23, are then placed in position with the auxiliary pressure rings 29, 30, thereon, and are forced toward one another by means of the bolts 26, thereby pressing the wrapping tape or band into the depressions 19, 20, and forcing the mold sections 10 and 11 snugly into their positions relative to the core. The auxiliary rings 29, 30, are then adjusted, if need be, to exert the desired amount of pressure on the wrapping tape or band in proximity to the thin outer edges of the mold section, thereby preventing any tendency on the part of the tire material to flow at these points, and exerting thereon at these points, where the strain on the tire is severe, when in use, the necessary pressure to make the tire firm and tough when cured. The mold, with tire thereon, is then placed in a suitable vulcanizing kiln where it may be cured either by dry heat or steam, as may be desired. In any event, the hot air or hot steam will pass through the wrapping tape or band and exert its influence directly upon the tire material.

In the form shown in Figs. 4, 5 and 6, the core, denoted by 37, is made in one continuous hollow annular ring instead of in sections, as shown in Figs. 1 to 3, inclusive, and there is therefore no need of the ring 5 for binding the core sections together or for any equivalent of said ring.

The other features, to wit; the mold sections, the pressure rings, the auxiliary pressure rings carried thereby, and the bolts for drawing the pressure rings toward each other, and the screws for adjusting the auxiliary pressure rings, may be quite similar in structure to those shown and described in Figs. 1 to 3, inclusive, and will operate in practice in substantially the same manner as already described.

It is obvious that changes might be resorted to in the form and arrangement of the several parts without departing from the spirit and scope of my invention; hence I do not wish to limit myself strictly to the structure herein shown and described, but

What I claim is:—

1. A tire mold comprising a core, mold sections arranged to press the opposite sides of the inner portion of the tire, pressure rings arranged to press the opposite sides of the tire in proximity to the outer edges of the mold sections and means for forcing the mold sections and pressure rings toward the tire.

2. A tire mold comprising a core, mold sections arranged to press the opposite sides of the tire along its inner portion, pressure rings for forcing the mold sections toward each other and additional pressure rings carried by the aforesaid pressure rings for pressing the opposite sides of the tire in proximity to the outer edges of the mold sections.

3. A tire mold comprising a core, mold sections arranged to engage the opposite sides of the tire along its inner portion and provided with depressions on their outer faces, pressure rings provided with projections adapted to enter the depressions in the outer faces of the mold sections, for tightening a wrapping tape or band, and additional pressure rings carried by the aforesaid pressure rings in position to press against a wrapping tape or band in proximity to the outer edges of the mold sections and means for forcing the members of the two sets of pressure rings toward each other.

4. A tire mold comprising a core, mold sections adapted to press the tire upon opposite sides of the inner portion thereof, pressure rings, means for forcing the pressure rings toward the mold sections and thereby forcing the mold sections toward each other, additional pressure rings carried by the aforesaid pressure rings and means for adjusting the additional pressure rings toward and away from each other independently of the pressure rings which support them.

5. A tire mold comprising a core provided with an inwardly extending fin, mold sections arranged on opposite sides of the fin for forming the clencher edges of the tire, the said core sections extending only partially along the opposite sides of the core, pressure rings, means for forcing the pressure rings toward the mold sections and hence the mold sections toward the core and additional mold pressure rings adjustably secured to the aforesaid pressure rings.

6. A tire mold comprising a core, formed in sections, the several sections being provided with inwardly extended fins, an annular ring secured to the fins of the core sections for maintaining the core sections assembled to form a continuous ring, mold sections for forming the clencher rings of the tire, the said mold sections being separated by the said fins and ring, and pressure rings, located exterior to the core sections, means for forcing the pressure rings toward each other and hence the core sections toward the aforesaid fins and connecting ring.

In testimony, that I claim the foregoing as my invention, I have signed my name in presence of two witnesses, this 27th day of March, 1908.

PETER D. THROPP.

Witnesses:
RACHEL SUMMER,
CLIFFORD W. LEE.